(12) United States Patent
Large et al.

(10) Patent No.: US 9,191,661 B2
(45) Date of Patent: Nov. 17, 2015

(54) VIRTUAL IMAGE DISPLAY DEVICE

(75) Inventors: Timothy Andrew Large, Bellevue, WA (US); Matthew J. Large, Guildford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 458 days.

(21) Appl. No.: 13/220,463

(22) Filed: Aug. 29, 2011

(65) Prior Publication Data
US 2013/0050186 A1 Feb. 28, 2013

(51) Int. Cl.
*G06T 15/50* (2011.01)
*H04N 13/04* (2006.01)

(52) U.S. Cl.
CPC ....... *H04N 13/0484* (2013.01); *H04N 13/0404* (2013.01); *H04N 13/0497* (2013.01)

(58) Field of Classification Search
USPC .................................. 345/426, 419; 348/59
See application file for complete search history.

(56) References Cited

U.S. PATENT DOCUMENTS

| | | | |
|---|---|---|---|
| 5,418,584 A | 5/1995 | Larson | |
| 5,731,899 A | 3/1998 | Meyers | |
| 5,798,739 A * | 8/1998 | Teitel | 345/8 |
| 5,999,147 A * | 12/1999 | Teitel | 345/8 |
| 6,043,799 A | 3/2000 | Tidwell | |
| 7,123,287 B2 * | 10/2006 | Surman | 348/51 |
| 7,703,924 B2 | 4/2010 | Nayar | |
| 7,889,425 B1 * | 2/2011 | Connor | 359/463 |
| 8,068,285 B1 * | 11/2011 | Flynn | 359/619 |
| 8,416,289 B2 * | 4/2013 | Akeley | 348/59 |
| 8,624,961 B2 * | 1/2014 | Li | 348/46 |
| 2004/0021768 A1 * | 2/2004 | Payne et al. | 348/51 |
| 2005/0225501 A1 | 10/2005 | Srinivasan et al. | |
| 2007/0097319 A1 * | 5/2007 | McKay et al. | 353/7 |
| 2008/0117289 A1 * | 5/2008 | Schowengerdt et al. | 348/46 |
| 2010/0097439 A1 * | 4/2010 | Kroll et al. | 348/14.02 |
| 2010/0150498 A1 | 6/2010 | Large | |
| 2010/0271467 A1 | 10/2010 | Akeley | |
| 2012/0050342 A1 * | 3/2012 | Huang et al. | 345/690 |

OTHER PUBLICATIONS

Urey et al. "State of the Art in Stereoscopic and Autostereoscopic Displays", IEEE, Apr. 2011.*
Holliman et al. "Three-Dimensional Displays: A Review and Applications Analysis", IEEE, Jun. 2011.*

(Continued)

*Primary Examiner* — Kimbinh T Nguyen
(74) *Attorney, Agent, or Firm* — Jeremy Snodgrass; Judy Yee; Micky Minhas

(57) ABSTRACT

This document describes techniques and apparatuses for implementing a virtual image display device. A virtual image display device may include a display and a microlens array positioned between the display and a viewing surface of the virtual image display device. The virtual image display device is controlled to generate a virtual image behind the viewing surface of the virtual image display device. In some embodiments, the virtual image display device includes a pupil tracker that locates positions of pupils of a viewer. The virtual image display device is controlled to render the virtual image based on the positions of the pupils of the viewer.

20 Claims, 12 Drawing Sheets

(56) References Cited

OTHER PUBLICATIONS

Liao, et al., "Long Visualization Depth Autostereoscopic Display using Light Field Rendering based Integral Videography", Retrieved at <<http://ieeexplore.ieee.org/xpl/freeabs_all.jsp?arnumber=1667679>>, Workshop on Emerging Display Technologies, Mar. 26, 2006, pp. 8-11.

"Real 3D display by Holografika", Retrieved at <<http://www.holografika.com/>>, Retrieved Date: May 31, 2011, pp. 3.

* cited by examiner

VIRTUAL IMAGE DISPLAY DEVICE

BACKGROUND

The physiological mechanism that sets eye focus is directly related to the mechanism that sets convergence. If a three dimensional (3D) image is represented on a screen for a viewer, the parallax (or the difference between images that are sent to each of the viewer's eyes) must be set to make the object appear near to the screen so that the viewer's eyes can comfortably converge and focus on the screen at the same time. This makes the representation of objects that are some distance away from the screen uncomfortable for the viewer in conventional 3D systems because the point of focus is necessarily fixed on the screen. This is a particular problem for devices designed to be held close to the viewer, such as laptops, tablets, and mobile phones. With these devices, fixing the parallax such that objects appear to be in the plane of the display makes it difficult to represent real-life objects, such as people, which would normally be a long distance behind the screen. Furthermore, users of near screen devices with farsightedness or presbyopia must typically wear rear reading glasses or contact lenses in order to see the information displayed on the screen of devices held close to their eyes.

SUMMARY

This document describes techniques and apparatuses for implementing a virtual image display device. A virtual image display device may include a display and a microlens array positioned between the display and a viewing surface of the virtual image display device. The virtual image display device is controlled to generate a virtual image behind the viewing surface of the virtual image display device. In some embodiments, the virtual image display device includes a pupil tracker that locates positions of pupils of a viewer. The virtual image display device is controlled to render the virtual image based on the positions of the pupils of the viewer. The virtual image display device enables correct rendering of 3-D information by allowing the parallax and focus to be placed away from the display surface. In addition, the virtual image display device allows focal accommodation for individuals normally requiring eye correction to view near objects.

This summary is provided to introduce simplified concepts in a simplified form that are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for implementing a virtual image display device are described with reference to the following drawings. The same numbers are used throughout the drawings to reference like features and components.

DETAILED DESCRIPTION

Overview

This document describes various apparatuses and techniques for implementing a virtual image display device. This virtual image display device includes a display and a microlens array positioned between the display and a viewing surface of the virtual image display device. The virtual image display device is controlled to generate a virtual image behind the viewing surface of the virtual image display device. The virtual image is an image formed in a focal plane located behind the viewing surface of the device, causing the viewing surface to act as a window through which a viewer perceives a larger display surface.

When the virtual image display device is configured as a two-dimensional (2D) display device and operated close to a viewer's eyes, the device enables viewers with a lack of focal accommodation (e.g., presbyopia or farsightedness) to view the virtual image without glasses or contact lenses. Additionally, when the virtual image display device is configured as a three-dimensional (3D) display device (e.g., a 3D television) and viewed at close range by the viewer, the virtual image generated by the device appears realistic because the parallax is rendered to make objects appear as though they are behind the viewing surface in real space.

In some embodiments, the virtual image display device includes a pupil tracker that locates positions of the pupils of a viewer. The virtual image display device is then controlled to render the virtual image based on the positions of the pupils of the viewer. For example, the virtual image display device adjusts a focus, parallax, and/or perspective of the virtual image so that the virtual image is viewable by the pupils of the viewer. The pupil tracker can also determine a change in the positions of the pupils. In response to determining the change in the positions of the pupils, the virtual image display device is controlled to render the virtual image based on the change in the positions of the pupils.

Example Environment

Figure 1:
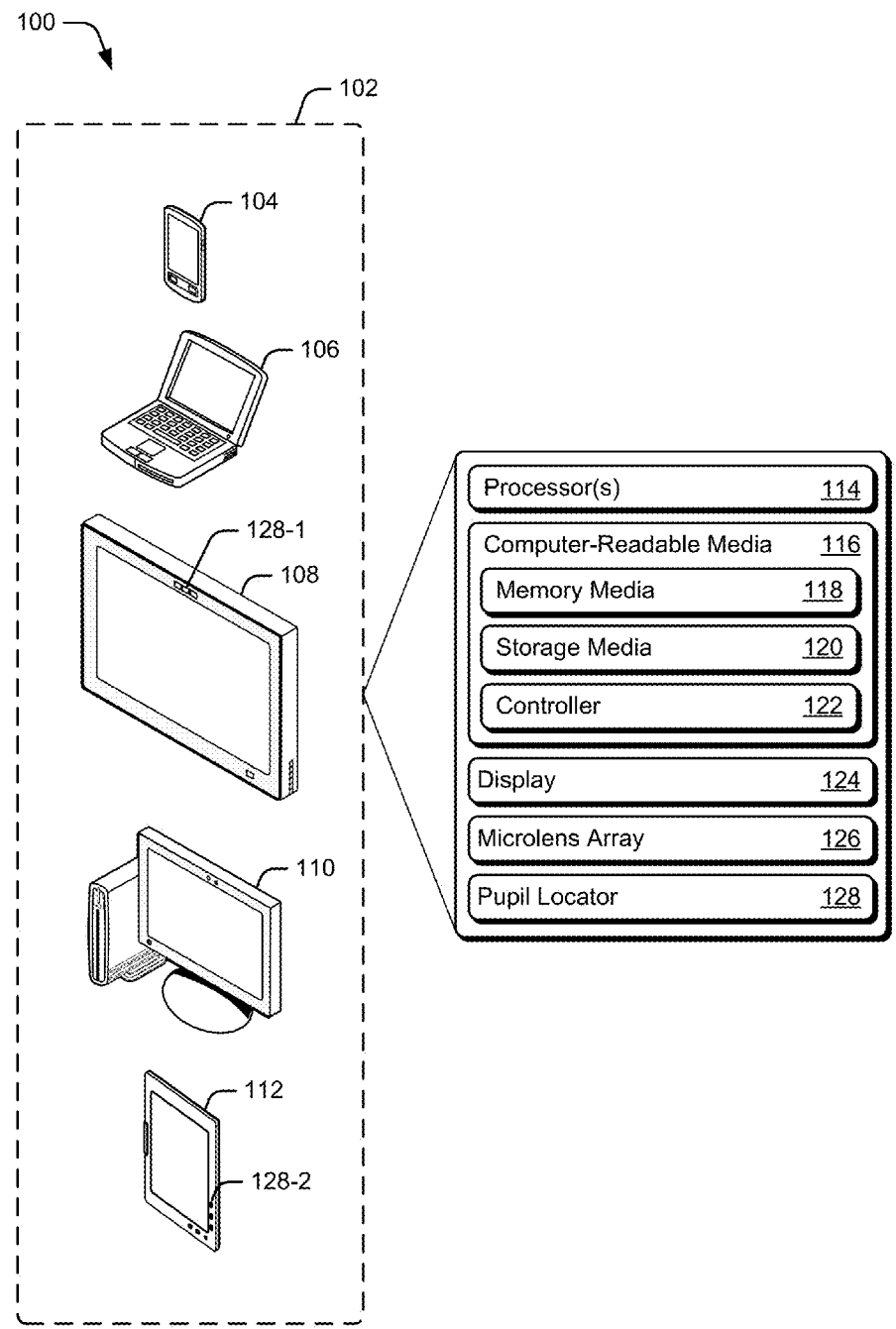
FIG. 1 illustrates an example environment in which a virtual image display device can be implemented.

FIG. 1 is an illustration of an example environment 100 in which a virtual image display device can be implemented. Environment 100 includes virtual image display device 102, which is illustrated, by way of example and not limitation, as one of a smart phone 104, laptop computer 106, television device 108, desktop computer 110, or tablet computer 112. Note that smart phone 104 and tablet computer 112 are examples of hand-held virtual image display devices typically operated close to the eyes of the user.

Virtual image display device 102 includes processor(s) 114 and computer-readable media 116, which includes memory media 118 and storage media 120. Applications and/or an operating system (not shown) embodied as computer-readable instructions on computer-readable media 116 can be executed by processor(s) 114 to provide some or all of the functionalities described herein. Computer-readable media also includes virtual image controller (controller) 122. How controller 122 is implemented and used varies, and is described as part of the methods discussed below.

Virtual image display device 102 also includes a display 124, a microlens array 126 that overlays display 124, and a pupil tracker 128. Display 124 may be configured as a high resolution, flat-panel electronic display, such as a high-resolution liquid crystal display (LCD). An LCD is an electronically modulated optical device composed of liquid crystal display pixels positioned in front of a light source to produce images. As described herein, display 124 includes a light source, an LCD, and in some embodiments an optical wedge.

Microlens array 126 is an array of small lenses that is placed between display 124 and a viewing surface (e.g., a screen) of display 124. Thus, microlens array is positioned between display 124 and a viewer of display 124. Microlens array 126 is configured to receive images from display 124 and to generate virtual images of distant objects placed behind the viewing surface of display 124.

Pupil tracker 128 is configured to locate positions of pupils of a viewer that is viewing display 124. Pupil tracker 128 provides these positions to controller 122 to enable controller 122 to control virtual image display device 102 to render the virtual image based on the positions of the pupils of the viewer. Pupil tracker 128 may be separate or integral with virtual image display device 102. Integral examples include pupil tracker 128-1 of television device 108 and pupil tracker 128-2 of tablet computer 112, whereas separate examples include stand-alone pupil trackers, such as pupil trackers operably coupled with virtual image display device 102, a set-top box, or a gaming device.

Figure 2:
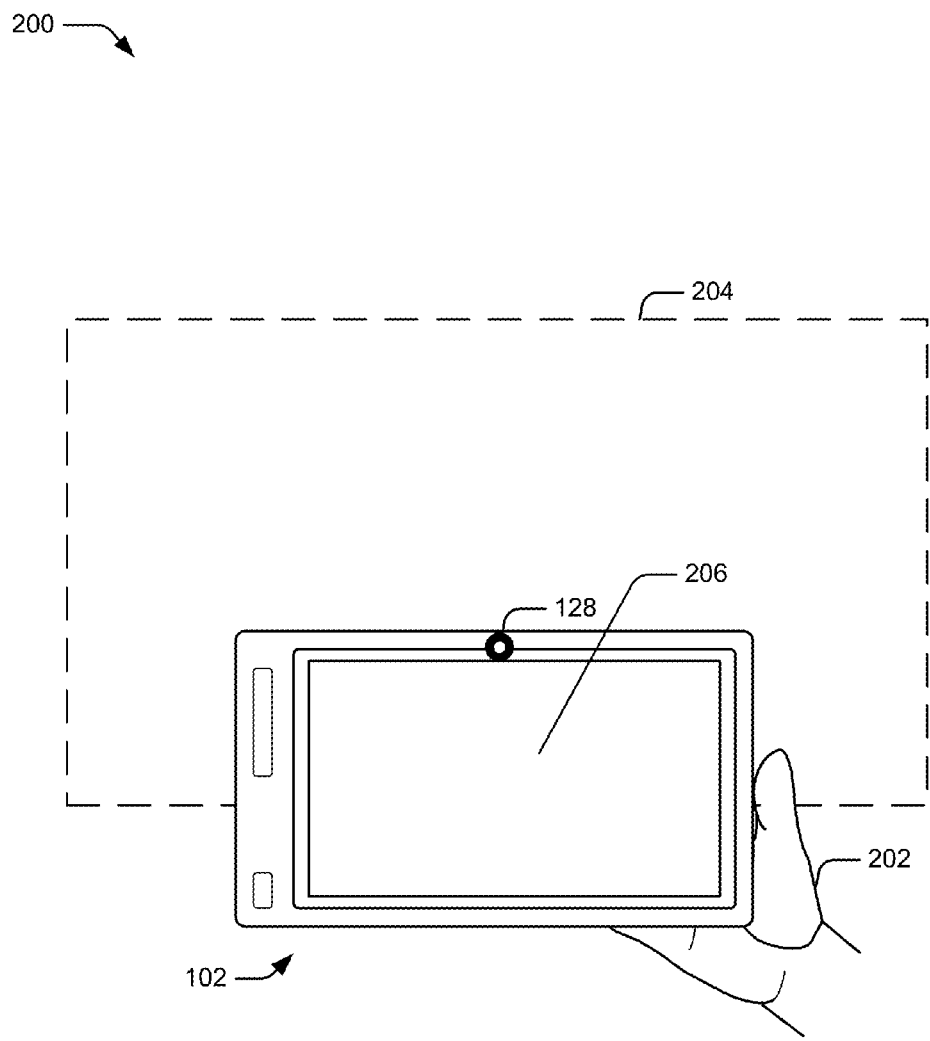
FIG. 2 illustrates a detailed example of a virtual image display device configured as a hand-held display device.

FIG. 2 illustrates a detailed example 200 of virtual image display device 102 configured as a hand-held display device that is typically operated close to the eyes of a viewer 202. In this detailed example, virtual image display device 102 generates a 2D virtual image 204 behind a viewing surface 206 of virtual image display device 102. Note that the size of virtual image 204 is larger than the size of viewing surface 206 and that the plane of virtual image 204 is behind viewing surface 206. This enables viewer 202 to focus on virtual image 204 when the display is operated close to the viewer's eyes (e.g., as a mobile device) even if the viewer suffers from presbyopia, farsightedness, or some other condition causing a lack of focal accommodation.

Figure 3:
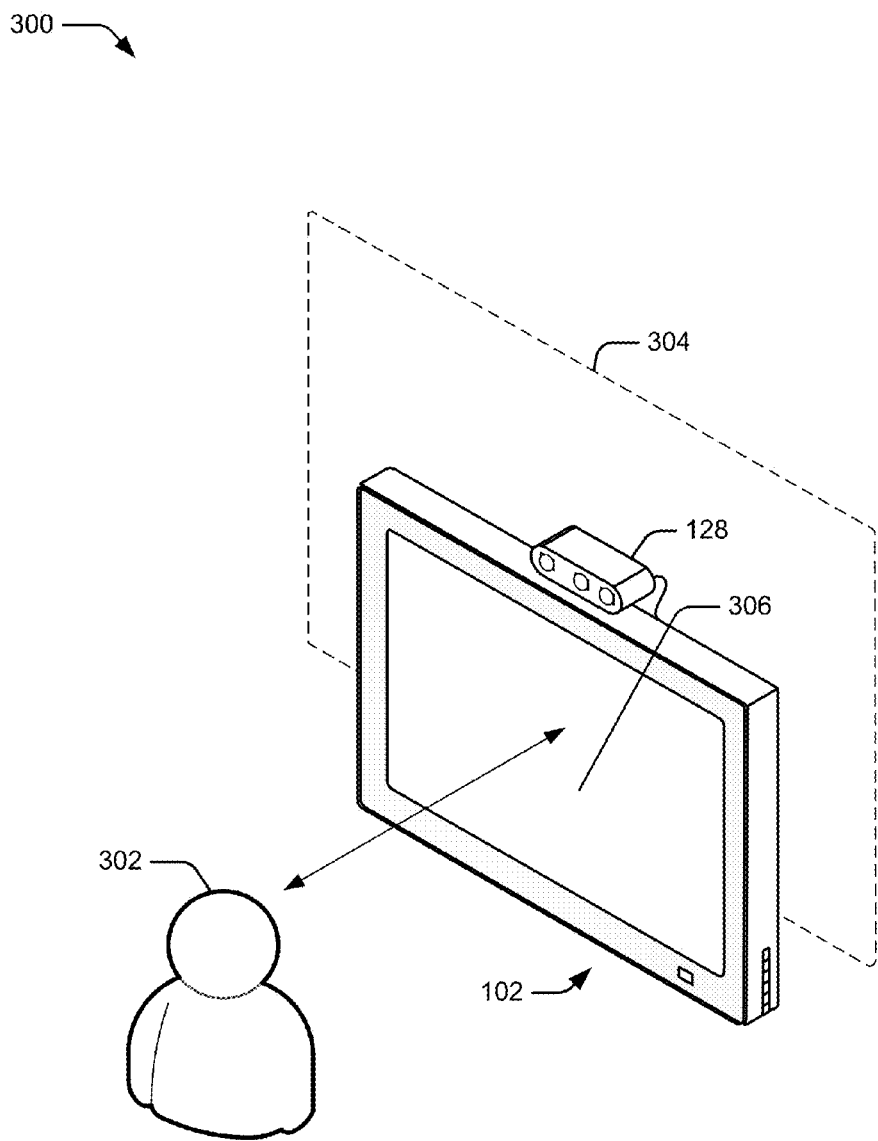
FIG. 3 illustrates a detailed example of a virtual image display device configured as a 3D display device.

FIG. 3 illustrates a detailed example 300 of virtual image display device 102 configured as a 3D display device that is viewed by a viewer 302. In this detailed example, virtual image display device 102 generates a 3D virtual image 304 behind a viewing surface 306 of virtual image display device 102. By generating 3D virtual image 304 behind viewing surface 306 of virtual image display device 102, the 3D virtual image appears realistic because the parallax is rendered to make virtual image 304 appear as though it is behind viewing surface 306 in real space.

In both FIG. 2 and FIG. 3, virtual image display device 102 includes pupil tracker 128 which locates positions of pupils of viewer 202 or viewer 302, respectively. Pupil tracker 128 provides these positions to controller 122 (not pictured) to enable controller 122 to control virtual image display device 102 to render the virtual image based on the positions of the pupils of viewer 202. For example, by locating the positions of the pupils, virtual image display device 102 can adjust a focus, parallax, and/or perspective of the virtual image in reference to the positions of the pupils so that the virtual image is viewable by viewer 202 or viewer 302.

In some embodiments, pupil tracker 128 includes an infra-red-sensitive camera and a synchronously modulated infra-red LED. Pupil tracker 128 locates the positions of the pupils by taking a picture of the viewer with a flash and identifying "red eye" caused by the flash to locate the positions of the pupils. For example, the positions of the pupils, as indicated by the red eye, can be identified in an otherwise low contrast infra-red image of the viewer's face.

In some embodiments, pupil tracker 128 is further configured to determine a change in the positions of the pupils. For example, the pupil tracker can determine when the pupils move left, right, up, or down relative to the viewing surface of virtual image display device 102, or when the pupils move further or closer to the viewing surface. This can occur by way of the viewer's pupils moving without the viewer's head or body moving, or it can occur by way of the viewer's head and/or body moving, which causes a corresponding change in the positions of the pupils. Pupil tracker 128 provides this change in the positions of the pupils to controller 122 to enable controller 122 to control virtual image display device 102 to render the virtual image based on the change in the positions of the pupils.

For example, controller 122 can control virtual image display device 102 to adjust the perspective, parallax, and/or focus of the virtual image as the viewer's pupils scan up, down, left, or right to simulate the effect of looking through a window at objects in real space. In addition, controller 122 can control virtual image display device 102 to move the virtual image as the positions of the viewer's pupils move. For example, if the viewer's pupils move upwards, controller 122 can control virtual image display device 102 to move the virtual image upwards so that the viewer sees the lower part of the virtual image to simulate the effect of looking through a window at objects in real space. Similarly, if the viewer's pupils move downwards, virtual image display device 102 moves the virtual image downwards; if the viewer's pupils move left, virtual image display device 102 moves the virtual image to the left; and if the viewer's pupils move right, virtual image display device 102 moves the virtual image to the right.

In addition, if the viewer's pupils move closer to the viewing surface of virtual image display device 102, controller 122 can control virtual image display device 102 to increase the field-of-view of the virtual image to simulate the effect of looking through a window at objects in real space. Similarly, if the viewer's pupils move further from the viewing surface of virtual image display device 102, controller 122 can control virtual image display device 102 to decrease the field of view-of-the virtual image.

Additionally, virtual image display device 102 includes a mechanism to stop one eye of the viewer seeing the rendered image of the other. Such mechanisms are known in the art, and may include any one or more of shutter glasses, light steering via a backlight, a very narrow angle backlight, or a parallax barrier.

Figure 4:
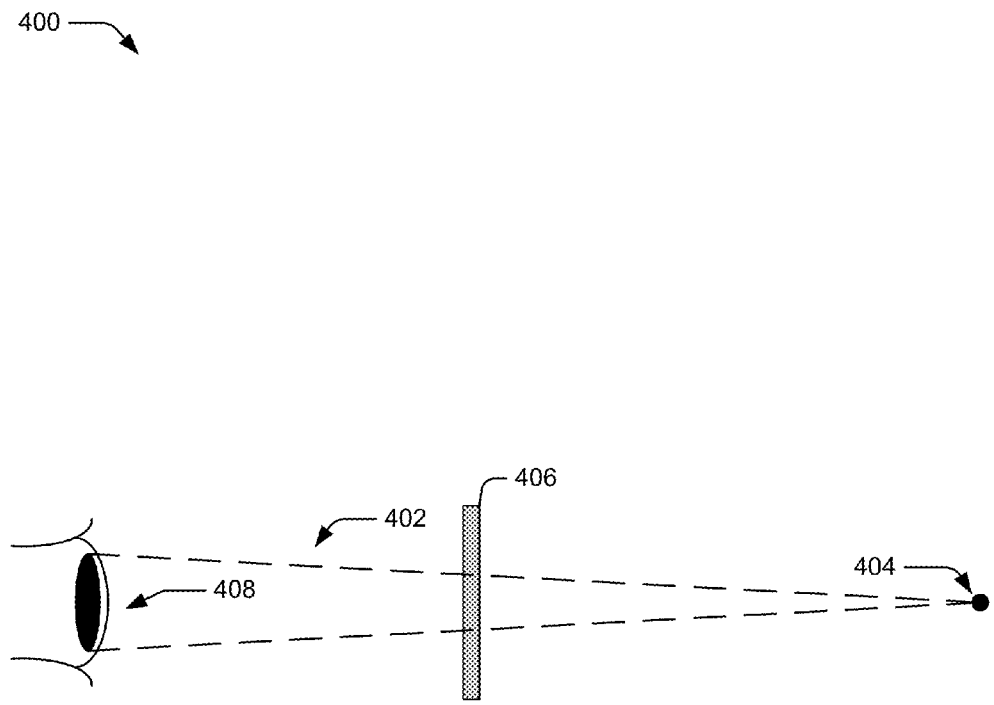
FIG. 4 illustrates a detailed example of generating a remote pixel of a virtual image.

In order to better understand how virtual image display device 102 generates a virtual image behind the viewing surface of the device, consider FIG. 4. FIG. 4 illustrates a detailed example 400 of generating a remote pixel of a virtual image. In this detailed example, light field 402 from a remote pixel 404 passes through a viewing surface 406 to a pupil 408 of a viewer's eye. To create a virtual image of pixel 404, the minimum level of information needed is light field 402, which fills pupil 408 of the viewer's eye. If pixel 404 is a very long distance from pupil 408, then light rays of light field 402 from pixel 404 will appear to be collimated as they are traced through viewing surface 406. Thus, in order to replicate light field 402 of pixel 404, microlens array 126 is configured to collimate light emitted by display 124 to the viewer's pupils.

In order to collimate light from display 124, microlens array 126 is placed between display 124 and the viewer. Display 124 is placed at a focal plane of microlens array 126, such that light from each display pixel of display 124 is collimated by microlens array 126. In this configuration the light field of each microlens can be controlled by selective illumination of the display pixels beneath it.

Figure 5:
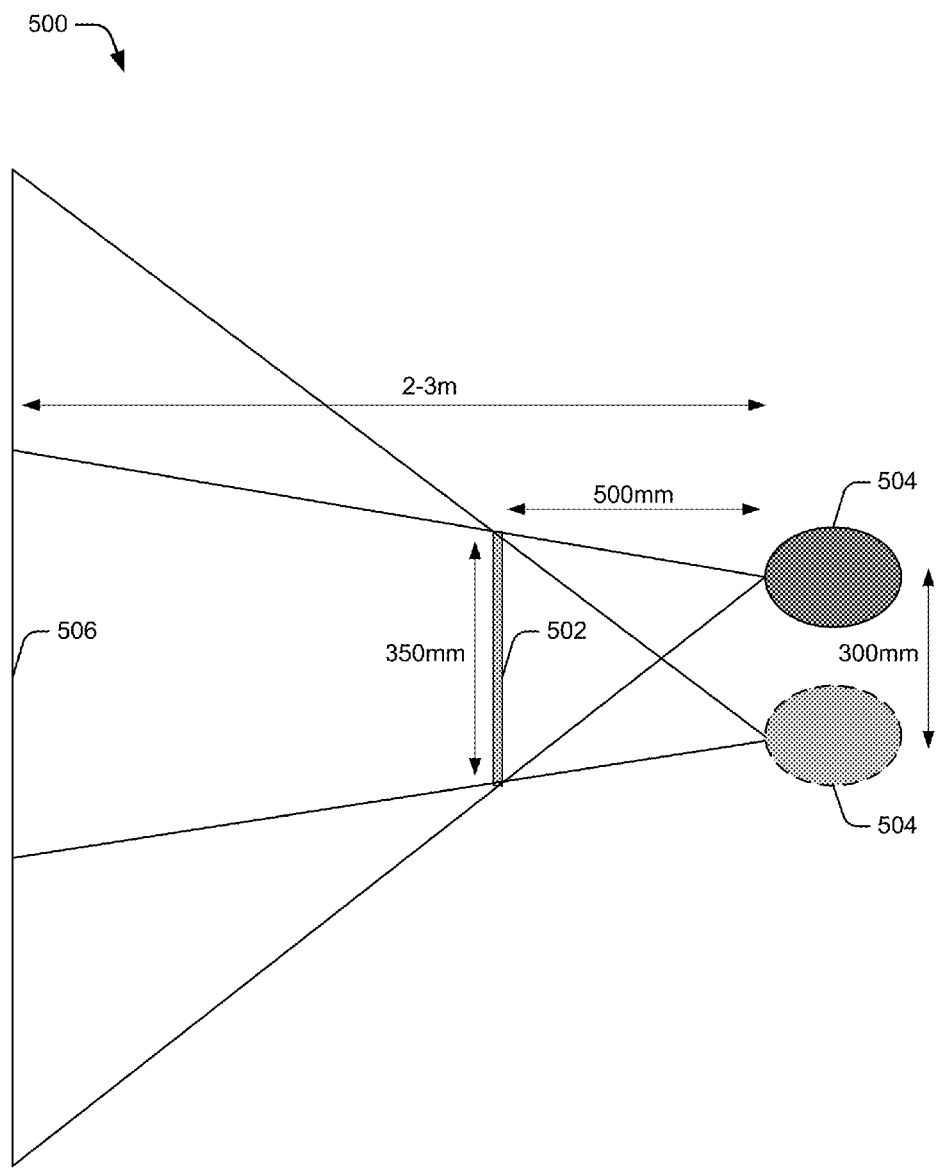
FIG. 5 illustrates a detailed example of a virtual image display.

FIG. 5 illustrates a detailed example 500 of a virtual image display. In this detailed example, a flat panel display 502 is positioned 500 mm away from a viewer's pupils 504. Flat panel display 502, in this example, is a laptop with a width of 350 mm which creates an eye box for pupils 504 of approximately 300 mm. Even though display 502 is positioned just 500 mm from pupils 504, display 502 creates a virtual image 506 on a plane that is approximately two to three meters from pupils 504. In addition, the width and height of virtual image 506 is at least two to three times the width and height, respectively, of display 502. Thus, a viewer looking at display 502 sees a much larger virtual display with a plane that is located two to three meters away.

Figure 6:
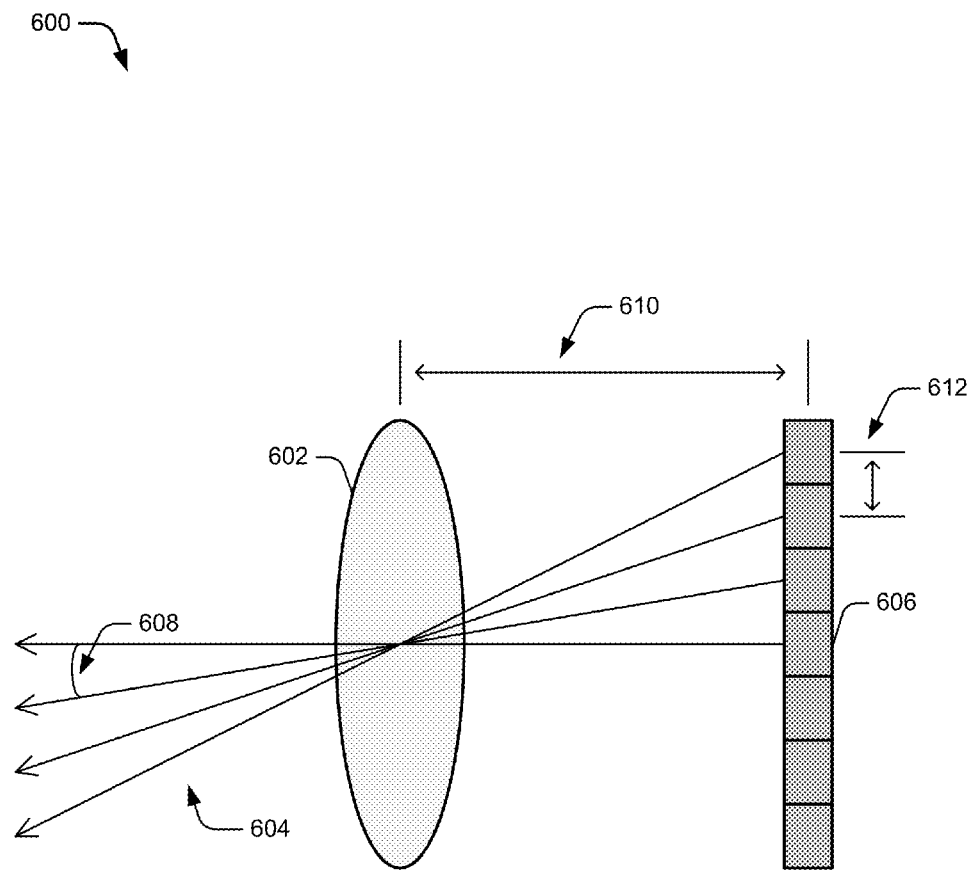
FIG. 6 illustrates a detailed example of a single microlens of the microlens array illustrated in FIG. 1.

FIG. 6 illustrates a detailed example 600 of a single microlens 602 of microlens array 126. In this detailed example, controller 122 controls an angular distribution of light rays 604 from microlens 602 by selectively illuminating display pixels 606 of display 124. An angular quantization 608 is a function of a focal length 610 of microlens 602 and a pixel pitch 612 of display pixels 606. Using these variables, controller 112 illuminates a set of display pixels 606 and selects positions in space of the viewer's pupils (determined by pupil tracker 128) to render a virtual image to the pupils of the viewer.

Figure 7:
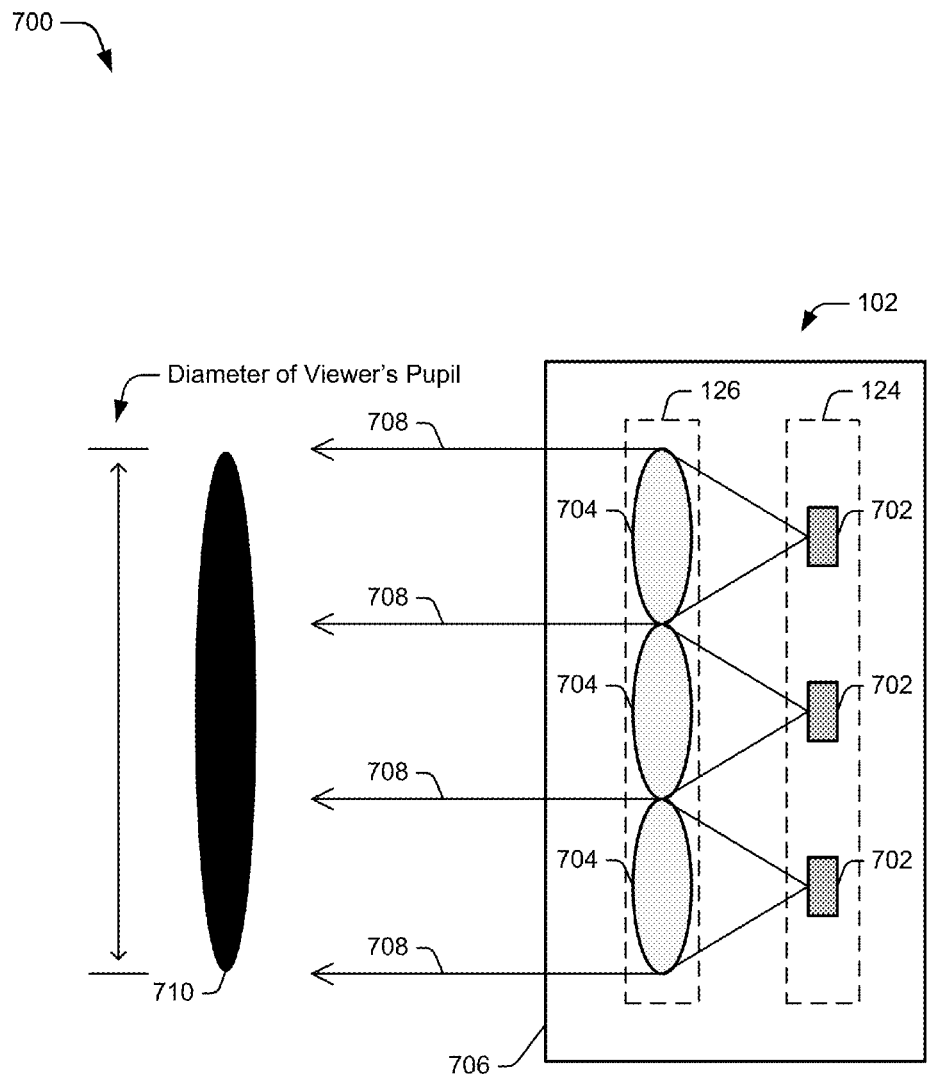
FIG. 7 illustrates a more-detailed example of the virtual image display device configured with the display and the microlens array illustrated in FIG. 1.

FIG. 7 illustrates a detailed example 700 of virtual image display device 102 configured with display 124 and microlens array 126. In this detailed example, display 124 includes multiple display pixels 702, and microlens array 126 includes multiple microlenses 704. Controller 122 controls display 124 and microlens array 126 to generate a virtual image behind a viewing surface 706 of display 124 by selectively illuminating display pixels 702. When display pixels 702 are illuminated, microlenses 704 receive the light from display pixels 702 and collimate light rays 708 to the viewer's pupil 710 to generate the virtual image.

Figure 8:
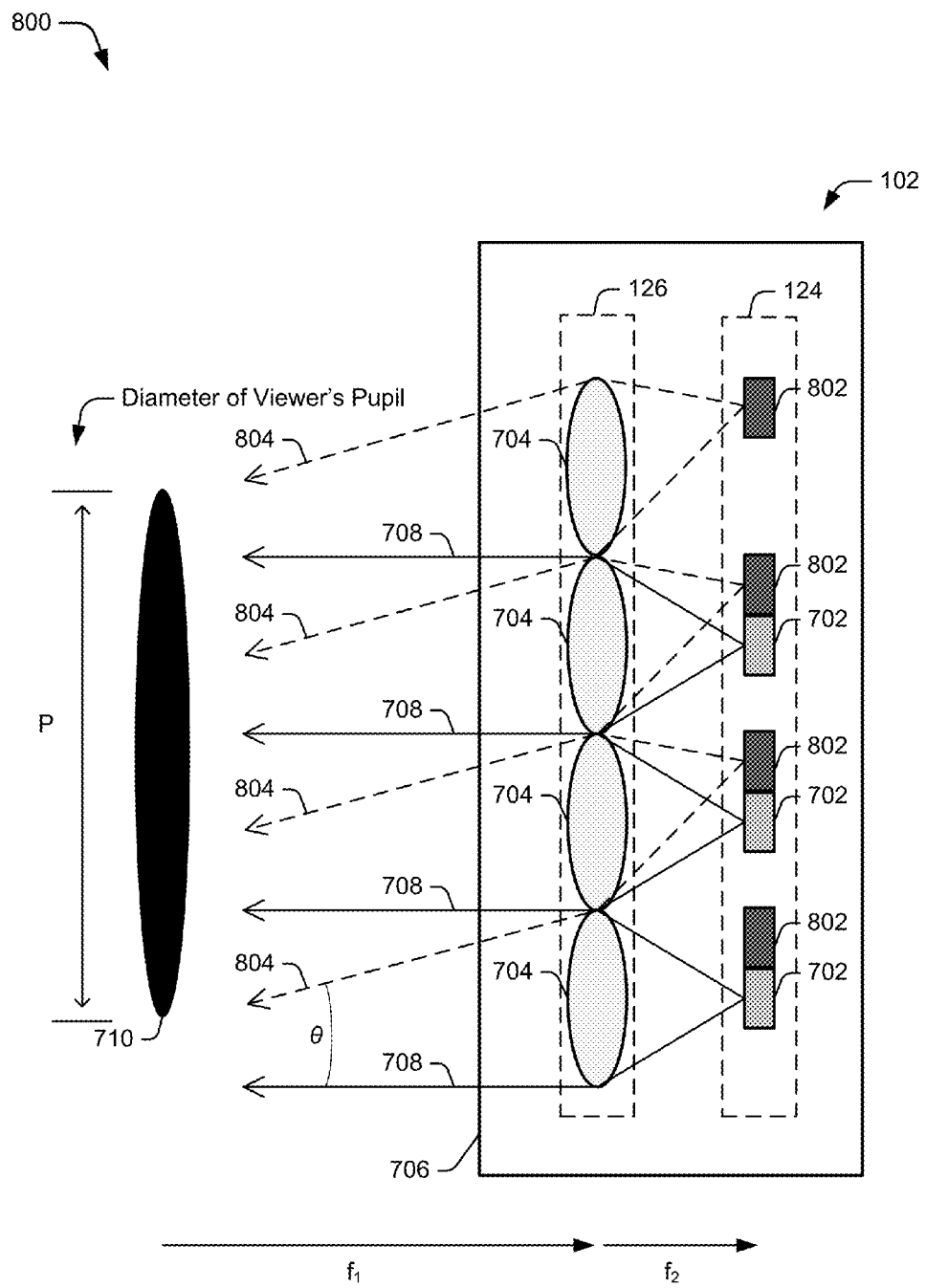
FIG. 8 is another more-detailed illustration of the virtual image display device configured with the display and the microlens array illustrated in FIG. 1.

FIG. 8 illustrates an additional detailed example 800 of virtual image display device 102 configured with display 124 and microlens array 126. In this detailed example, pupil 710 moves or scans upwards, which is detected by pupil tracker 128. In response, controller 122 selectively illuminates a different set of display pixels 802 to cause microlenses 704 to collimate light rays 804 to pupil 710. The spacing of display pixels 802 is the same as that of display pixels 702, as they are still spaced evenly across pupil 710. The translation from display pixels 702 to display pixels 802 is calculated based on the focal length of the microlenses 704 and the pixel pitch of display pixels 702 and 802, as discussed with regards to FIG. 7.

In this example, $f_1$ is the distance from pupil 710 to microlens array 126, $f_2$ is the focal length of each microlense 704, P is the diameter of pupil 710, and θ is the angular resolution of display 124. Assuming that n is the ratio of pupil diameter to lens diameter, and D is the display pixel width, then the following relationships apply:

$$f_2 = f_1/(n-1)$$

$$\theta = P/(n*f_1)$$

$$D = P/n*(n-1)$$

Figure 9:
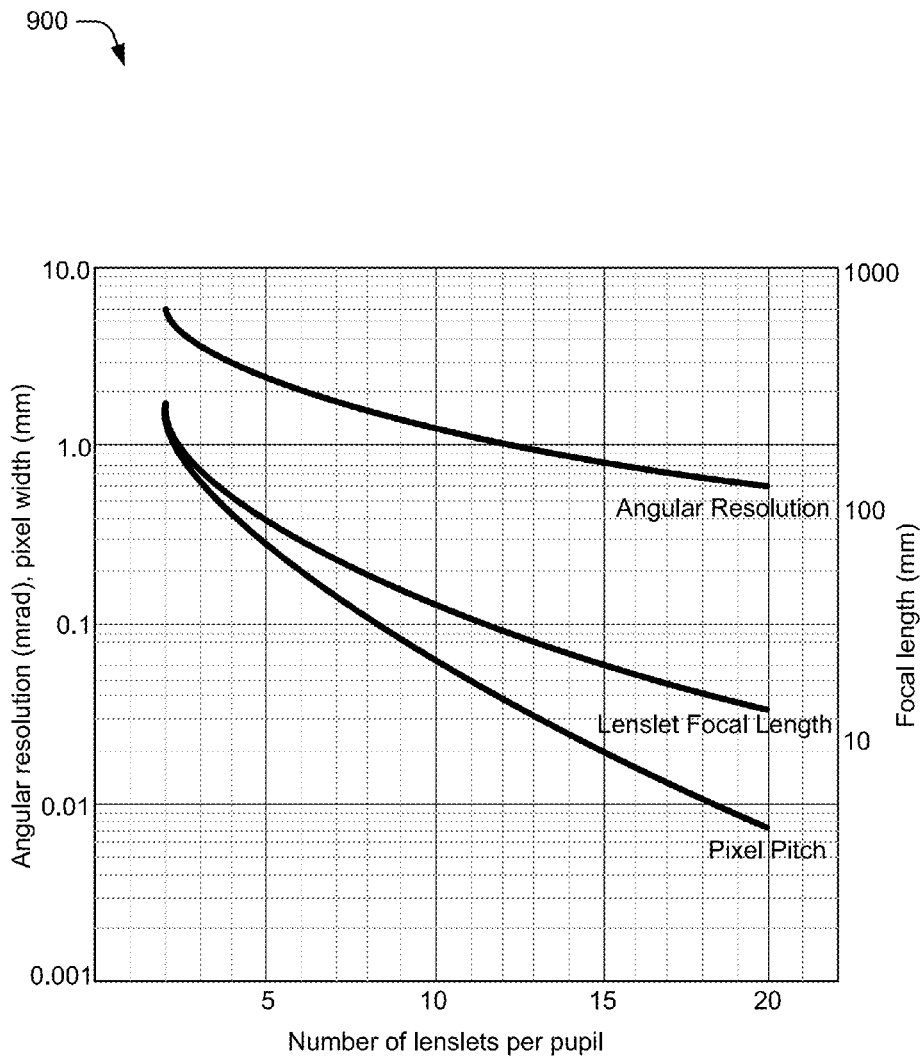
FIG. 9 illustrates an example graph 900 of the relationship between angular resolution, pixel width, and focal length as a function of the number of lenslets per pupil.

An example graph 900 of the relationship between angular resolution, pixel width, and focal length as a function of the number of lenslets per pupil is illustrated in FIG. 9.

Figure 10:
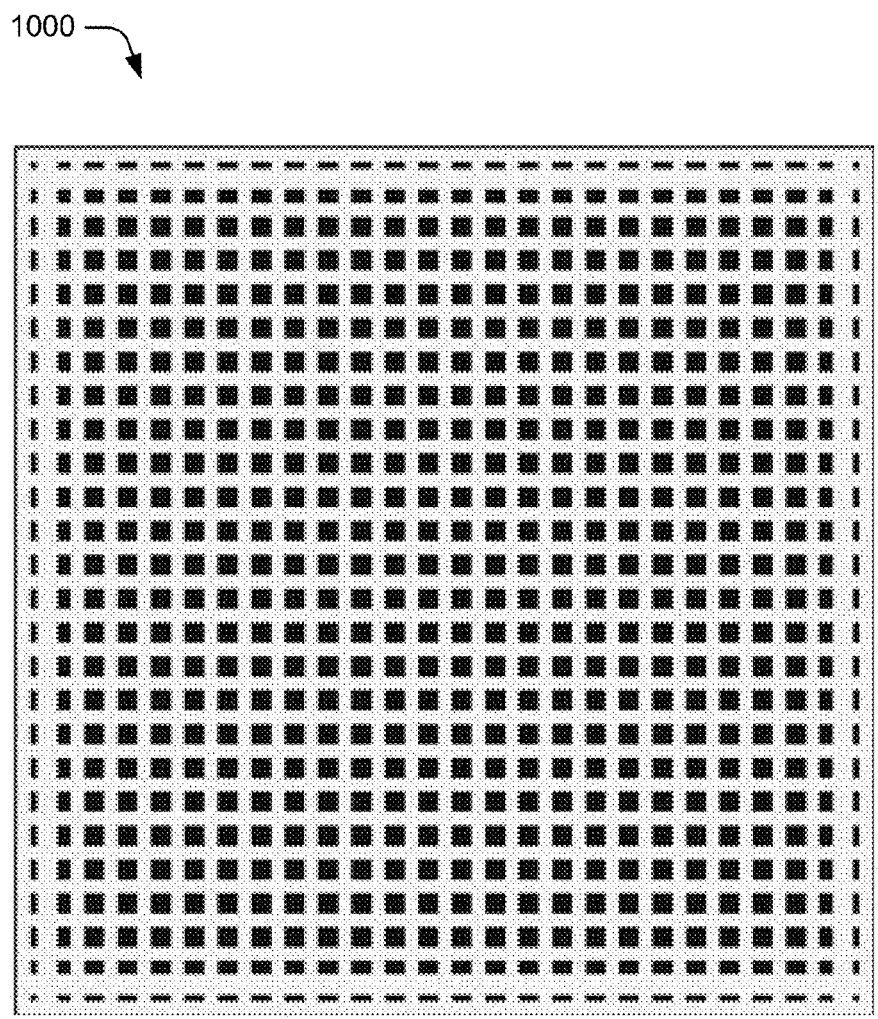
FIG. 10 illustrates a detailed example of a pixel mapping for a rectilinear microlens array overlaid over a square display pixel array of the display illustrated in FIG. 1.

By considering the illuminated display pixel groupings as the eye scans the display surface one microlens at a time, a pixel mapping of the display pixels needed to create a contiguous array of virtual pixels is generated. FIG. 10 illustrates a detailed example 1000 of a pixel mapping for a rectilinear microlens array 126 overlaid over a square display pixel array of display 124. In this detailed example, the pixel mapping is a 128×128 display of pixels. At a fixed viewing distance this pixel mapping produces a contiguous array of 23×23 virtual pixels.

Example Method

Figure 11:
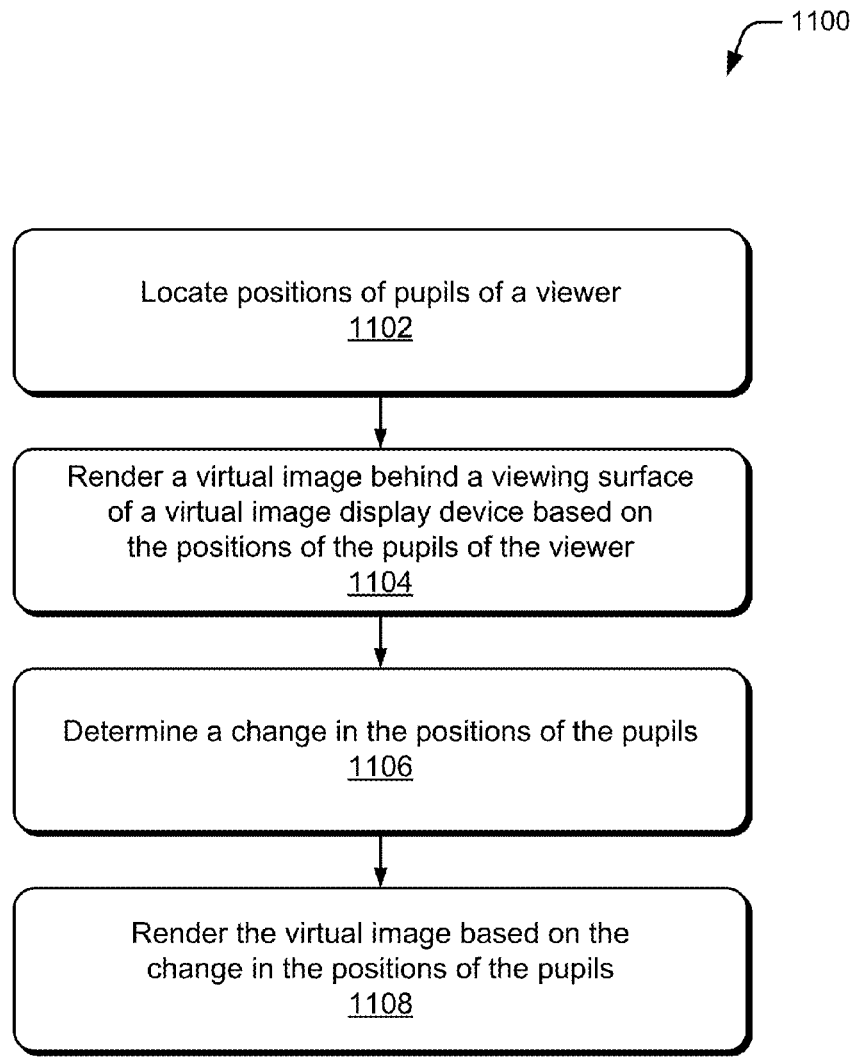
FIG. 11 illustrates an example method for controlling a virtual image display device.

FIG. 11 is flow diagram depicting an example method 1100 for controlling a virtual image display device to generate a virtual image behind a viewing surface of the virtual image display device. Block 1102 locates positions of pupils of a viewer. For example, pupil tracker 128 locates positions of the pupils of viewer 202 (FIG. 2) that is viewing virtual image display device 102. Pupil tracker 128 then provides the positions of the pupils to controller 122. Block 1104 renders a virtual image behind a viewing surface of a virtual image display device based on the positions of the pupils of the viewer. For example, responsive to receiving the positions of the pupils, controller 122 controls virtual image display device 102 to render virtual image 204 behind viewing surface 206 of virtual image display device 102 based on the positions of the pupils of viewer 202.

Block 1106 determines a change in the positions of the pupils. For example, pupil tracker 128 determines a change in the positions of the pupils of viewer 202 relative to viewing surface 206 of virtual image display device 102. Pupil tracker 128 then provides the change in the positions of the pupils to controller 122. Block 1108 renders the virtual image based on the change in the positions of the pupils. For example, responsive to receiving the change in the positions of the pupils, controller 122 controls virtual image display device 102 to render virtual image 204 behind viewing surface 206 of virtual image display device 102 based on the change in the positions of the pupils of viewer 202.

In an embodiment, to render the virtual image based on the positions of the pupils of the viewer, controller 122 selectively illuminates a first set of display pixels (e.g., display pixels 702 of FIG. 7) of display 124 to cause light from the first set of display pixels to pass through microlens array 126. Microlens array 126 collimates the light from the first set of display pixels to the pupils of the viewer to render the virtual image behind the viewing surface of the virtual image display device based on the positions of the pupils of the viewer. Then, to render the virtual image based on the change in the positions of the pupils of the viewer, controller 122 selectively illuminates a second set of display pixels (e.g., display pixels 802 of FIG. 8) of display 124 to cause light from the second set of display pixels to pass through microlens array 126. Microlens array 126 collimates the light from the second set of display pixels to the pupils of the viewer to render the virtual image based on the change in the positions of the pupils.

Example Device

Figure 12:
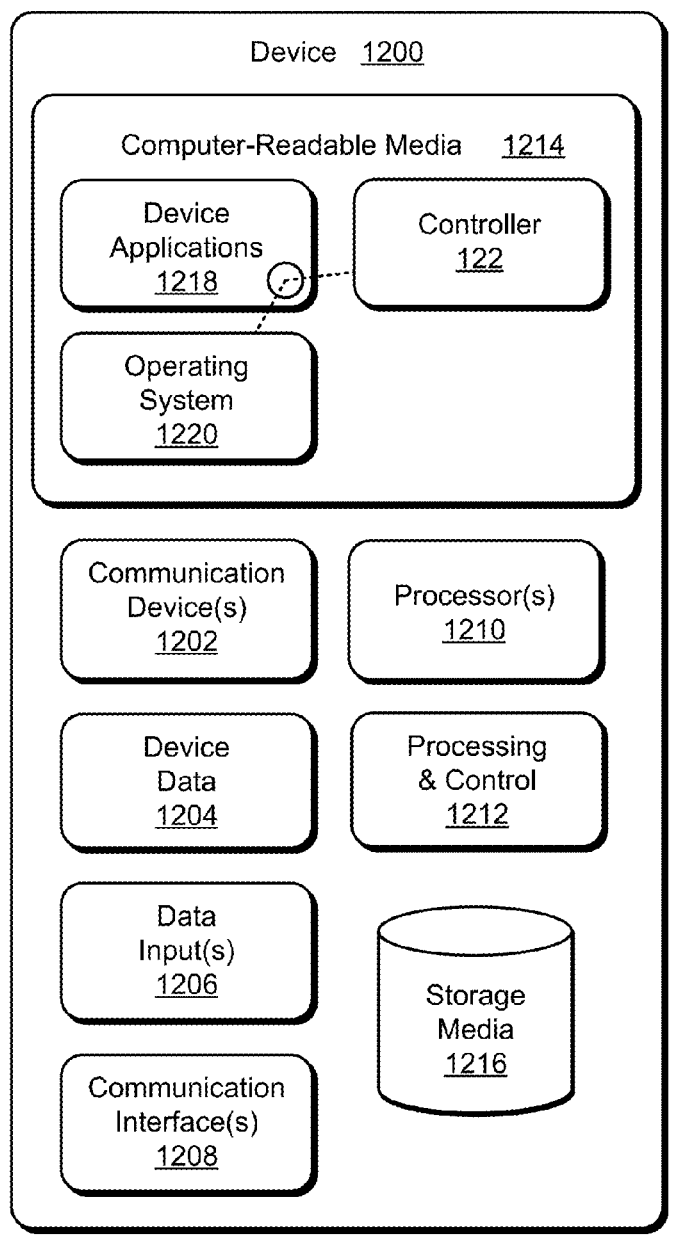
FIG. 12 illustrates an example device in which techniques for a virtual image display device can be implemented.

FIG. 12 illustrates various components of example device 1200 that can be implemented as any type of client, server, and/or display device as described with reference to the previous FIGS. 1-9 to implement techniques enabling a virtual image display device. In embodiments, device 1200 can be implemented as one or a combination of a wired and/or wireless device, a head-mounted display device (e.g., eyeglasses, sunglasses, etc.) as a form of flat panel display, television, television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1200 may also be associated with a viewer (e.g., a person or user) and/or an entity that operates the device such that a device describes logical devices that include users, software, firmware, and/or a combination of devices.

Device 1200 includes communication devices 1202 that enable wired and/or wireless communication of device data 1204 (e.g., received data, data that is being received, data scheduled for broadcast, data packets of the data, etc.). The device data 1204 or other device content can include configuration settings of the device, media content stored on the device, and/or information associated with a user of the device. Media content stored on device 1200 can include any type of audio, video, and/or image data. Device 1200 includes one or more data inputs 1206 via which any type of data, media content, and/or inputs can be received, such as user-selectable inputs, messages, music, television media content, recorded video content, and any other type of audio, video, and/or image data received from any content and/or data source.

Device 1200 also includes communication interfaces 1208, which can be implemented as any one or more of a serial and/or parallel interface, a wireless interface, any type of network interface, a modem, and as any other type of communication interface. The communication interfaces 1208 provide a connection and/or communication links between device 1200 and a communication network by which other electronic, computing, and communication devices communicate data with device 1200.

Device 1200 includes one or more processors 1210 (e.g., any of microprocessors, controllers, and the like), which process various computer-executable instructions to control the operation of device 1200 and to enable techniques for implementing a virtual image display device. Alternatively or in addition, device 1200 can be implemented with any one or combination of hardware, firmware, or fixed logic circuitry that is implemented in connection with processing and control circuits which are generally identified at 1212. Although not shown, device 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1200 also includes computer-readable storage media 1214, such as one or more memory devices that enable persistent and/or non-transitory data storage (i.e., in contrast to mere signal transmission), examples of which include random access memory (RAM), non-volatile memory (e.g., any one or more of a read-only memory (ROM), non-volatile RAM (NVRAM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1200 can also include a mass storage media device 1216.

Computer-readable storage media 1214 provides data storage mechanisms to store the device data 1204, as well as various device applications 1218 and any other types of information and/or data related to operational aspects of device 1200. For example, an operating system 1220 can be maintained as a computer application with the computer-readable storage media 1214 and executed on processors 1210. The device applications 1218 may include a device manager, such as any form of a control application, software application, signal-processing and control module, code that is native to a particular device, a hardware abstraction layer for a particular device, and so on.

The device applications 1218 also include any system components or modules to implement techniques using or enabling a virtual image display device. In this example, the device applications 1218 can include controller 122 for controlling a virtual image display device.

Conclusion

This document describes various apparatuses and techniques for implementing a virtual image display device. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A device comprising:
   a display;
   a pupil tracker configured to locate positions of pupils of a viewer of the display;
   a microlens array positioned between the display and a display screen of the device; and
   a controller configured to control an angular distribution of light rays from the microlens array, based on the positions of the pupils of the viewer located by the pupil tracker, by selectively illuminating one or more sets of display pixels of the display to cause light from the one or more sets of display pixels of the display to pass through the microlens array to collimate the light from the display to the pupils of the viewer to generate a virtual image behind the display screen of the device, the display screen positioned between the virtual image and a position at which the viewer views the display screen.

2. A device as described in claim 1, wherein the pupil tracker is further configured to determine a change in the positions of the pupils.

3. A device as described in claim 2, wherein the controller is further configured to control the display and the microlens array to generate the virtual image based on a change in the positions of the pupils.

4. A device as described in claim 1, wherein the controller is further configured to control the display and the microlens array to generate a two-dimensional virtual image behind the display screen of the device.

5. A device as described in claim 1, wherein the controller is further configured to control the display and the microlens array to generate a three-dimensional virtual image behind the display screen of the device.

6. A device as described in claim 1, wherein the display comprises a flat-panel high-resolution display.

7. A device as described in claim 1, wherein the display comprises a liquid crystal display.

8. A device as described in claim 1, wherein a size of the virtual image behind the display screen is larger than a size of the display screen.

9. A device as described in claim 1, wherein a plane of the virtual image is positioned behind the display screen.

10. A device as described in claim 1, wherein a parallax of the virtual image is rendered to cause the virtual image to appear behind the display screen.

11. A computer-implemented method comprising:
locating positions of pupils of a viewer; and
controlling an angular distribution of light rays from a microlens array of a display device, based on the positions of the pupils of the viewer, by selectively illuminating display pixels of a display of the display device to cause light from the display to pass through the microlens array to collimate the light from the display to the pupils of the viewer to generate a virtual image behind a display screen of a display device, the display screen positioned between the virtual image and a position of the viewer.

12. A computer-implemented method as described in claim 11, further comprising determining a change in the positions of the pupils.

13. A computer-implemented method as described in claim 12, wherein the change in the positions of the pupils comprises movement of the pupils up, down, left, or right relative to the display screen of the display device.

14. A computer-implemented method as described in claim 12, further comprising rendering the virtual image based on the change in the positions of the pupils.

15. A computer-implemented method as described in claim 14, wherein:
the rendering the virtual image behind a display screen of a display device based on the positions of the pupils of the viewer comprises selectively illuminating a first set of display pixels of the display to cause light from the first set of display pixels to pass through the microlens array; and
the rendering the virtual image based on the change in the positions of the pupils comprises selectively illuminating a second set of display pixels of the display to cause light from the second set of display pixels to pass through the microlens array, the microlens array configured to collimate the light from the first set of display pixels and from the second set of display pixels to the pupils of the viewer to render the virtual image behind the display screen of the display device.

16. A computer-implemented method as described in claim 11, wherein a size of the virtual image behind the display screen is larger than a size of the display screen.

17. A computer-implemented method as described in claim 11, wherein a plane of the virtual image is positioned behind the display screen of the display device.

18. A hand-held display device comprising:
a pupil tracker that is configured to locate positions of the pupils of a viewer of the hand-held display device;
a display screen; and
a microlens array positioned behind the display screen, the microlens array configured to collimate light from a display to the pupils of the viewer to generate a virtual image behind the display screen such that the display screen is positioned between the virtual image and a position of the viewer, wherein the pupil tracker is configured to detect when the hand-held display device is moved closer to the pupils of the viewer, and wherein the microlens array is configured to increase a field-of-view of the virtual image when the hand-held display device is moved closer to the pupils of the viewer.

19. A hand-held display device as described in claim 18, wherein a size of the virtual image is greater than a size of the display screen.

20. A hand-held display device as described in claim 18, wherein a plane of the virtual image is positioned behind the display screen.

\* \* \* \* \*